United States Patent [19]

Bassett

[11] Patent Number: 4,688,827
[45] Date of Patent: Aug. 25, 1987

[54] PIPELINE SAFETY JOINT
[75] Inventor: Max Bassett, Houston, Tex.
[73] Assignee: James Howden & Company Limited, Glasgow, Scotland
[21] Appl. No.: 875,544
[22] Filed: Jun. 18, 1986
[51] Int. Cl.⁴ ............................................. F16L 35/00
[52] U.S. Cl. ......................................... 285/2; 285/18; 285/900
[58] Field of Search ................... 285/900, 2, 3, 4, 100, 285/101, 18

[56] References Cited

U.S. PATENT DOCUMENTS

| | | | |
|---|---|---|---|
| 4,059,288 | 11/1977 | Mohr | 285/900 X |
| 4,348,039 | 9/1982 | Miller | 285/900 X |
| 4,452,472 | 6/1984 | Crase | 285/3 |
| 4,501,287 | 2/1985 | Thompson | 285/3 X |

Primary Examiner—Dave W. Arola
Attorney, Agent, or Firm—Fleit, Jacobson, Cohn & Price

[57] ABSTRACT

A pipeline safety joint to provide a controlled weakness in a pipeline in which a pair of tubular mandrels are connectable to first and second pipe-ends. A portion of the first mandrel of a pair is insertable in a part of the other and a latch mechanism is provided on said portion engageable with the part of the other mandrel of the pair to hold the mandrels against axial separation. A retaining shoulder on the first mandrel retains the latch mechanism in engagement and a tubular sealing is positioned to seal the two mandrels.

A fluid-tight pressure compensation chamber surrounds said portion of the first mandrel and is engageable directly or indirectly on said one mandrel and said other mandrel of the pair. A fluid passage provides communication between the interior of the mandrel and its associated pressure compensation chamber, the seal and its associated compensation chamber being dimensioned whereby forces produced to separate the mandrels of a pair are substantially equalized by the fluid pressure appearing in the fluid compensation chamber. Frangible securing means, such as a bolt, normally holds the two mandrels in interengagement but break when a predetermined stress is applied, the pressure compensation chamber being axially crushable when the frangible means break, thereby allowing limited axial movement between the mandrels, sufficiently to permit the retaining shoulder to move axially to release the latch mechanism, thereby to allow the mandrels to disengage from one another.

15 Claims, 2 Drawing Figures

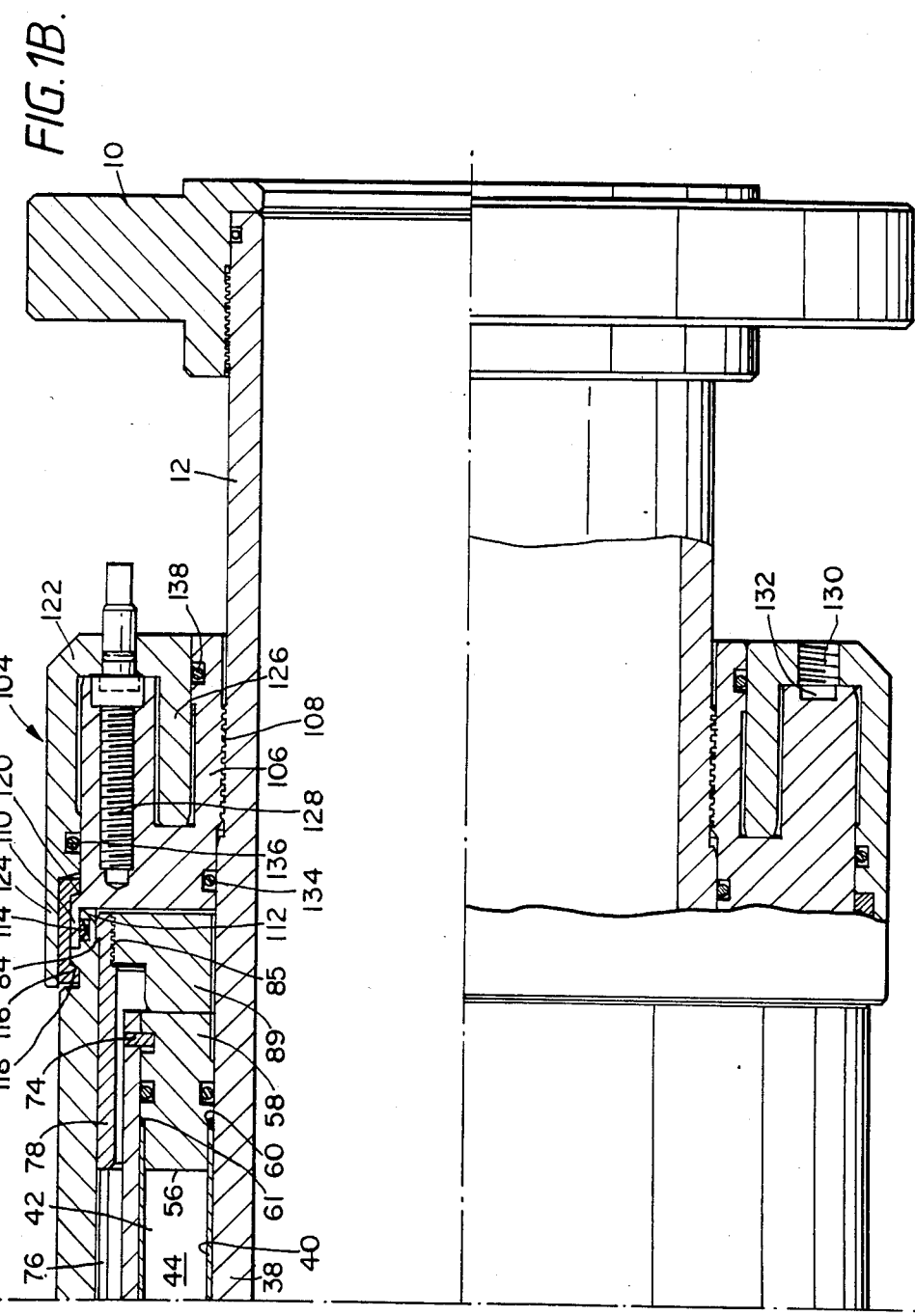

4,688,827

PIPELINE SAFETY JOINT

FIELD OF THE INVENTION

The present invention relates to a pipeline safety joint to provide a controlled point of weakness in at least one pipeline.

BACKGROUND OF THE INVENTION

There are many situations in which it is advisable to provide a point of weakness in a pipeline, or a bundle of pipelines, so that should some excessive external force act on the pipeline, it will be enabled to break at the point of weakness without causing damage to the installations to which the pipeline is attached. One particular environment in which danger of such an excessive force arises in an undersea oil pipeline connected to an undersea oil well or other similar equipment.

It has been proposed to provide a separable and at least partially pressure balanced safety pipeline connector or joint for this purpose in U.S. Pat. No. 4,059,288 issued 22 Nov. 1977 to Harvey O Mohr. This safety joint is designed with the purpose of providing a pressure balanced weak point, whereby the connector can separate at a predetermined tension load, for example if the pipeline is caught on a ship's anchor and dragged, wherein the pressure prevailing in the pipeline will have as small an effect as possible on the separation. This is achieved by having a housing one axial end of which is connected to the pipeline and the other axial end is left open, the joint including a pipe extension member having one axial end adapted for connection to the pipeline for transmission of line fluids therethrough and the other axial ends arranged to be telescopically received in the housing in sealed relationship thereto. The housing and extension member are arranged to provide an annular pressure chamber to which the fluid pressure from the pipeline is fed so that the housing and extension members are forced axially towards one another the balance of pressure prevailing in the pipeline. Additionally a shear disk is mounted between the housing and extension member to retain these two parts against relative axial movement. The shear disk is, however, designed to rupture at a predetermined load such that axial separation is prevented below that level and is permitted above that level.

While such a construction is satisfactory in theory, it has never proved fully satisfactory in practice because it has never been possible to overcome the problems of hydrostatic pressure prevailing at the bottom of the sea or fully to balance the loads caused by the oil pressure in the pipeline.

OBJECT OF THE INVENTION

It is an object of the present invention to provide an improved pipeline safety joint so that a controlled point of weakness is formed in at least one pipeline, which safety joint overcomes the foregoing disadvantages.

SUMMARY OF THE INVENTION

It is now proposed, according to the present invention, to provide a pipeline safety joint for giving a controlled point of weakness in at least one pipeline, said safety joint comprising at least one pair of tubular mandrels, each mandrel of a pair being sized to be securable to a pipe end of a pipeline; a portion of one mandrel of the or each pair is insertable in a part of the other mandrel to provide fluid communication between the pipe ends; a latch mechanism is provided on said portion of at least one pair engagable within said part of the other mandrel thereof, effective to hold said mandrels against axial separation. Retaining means on said one mandrel of said at least one pair retains said latch mechanism in engagement and a sealing ring is positioned to seal said at least one pair of tubular mandrels. A fluid-tight pressure compensation chamber surrounds said portion said one mandrel of said at least one pair and is engagable directly or indirectly on said one mandrel and said other mandrel of said at least one pair. Fluid passage means provide fluid communication between the interior of said at least one mandrel and its associated fluid-tight pressure compensation chamber, said at least one seal and its associated compensation chamber being so dimension whereby forces produced to separate said mandrels of a pair by fluid pressure within said mandrels are substantially equalised by said fluid compensation chamber. Frangible securing means normally hold said mandrels of said at least one pair in interengagement, but these break when a predetermined stress is applied thereto, the pressure compensation chamber being axially crushable when said frangible securing means break, thereby initally allowing limited axial movement between said mandrels of said at least one pair sufficiently to permit said retaining means to move axially to release said latch mechanism, thereby to allow the mandrels of said at least one pair to disengage from one another.

With a construction as set forth above, because the compensation chamber is entirely fluid-tight it is unaffected by external hydrostatic pressures and is incapable of any leakage because there are no seals, such as sliding seals at all.

While the compensation chamber could be in the form of a generally flexible toroidal member, akin to the inflation tube of a motor vehicle tire, in a preferred construction, the fluid compensation chamber comprises inner and outer co-axial rigid tubes surrounding said portion of said one mandrel of each said at least one pair and first and second end walls each interconnecting said inner and outer rigid tubes, to define therewith said fluid compensation chamber. The walls can be made of a material such as that sold under the trade name Inconel, which is substantially inert to material, such as oil, being passed through the pipeline, is long lasting and has a limited degree of resilience to enable the compensation chamber to expand and contract slightly to absorb fluctuations in line pressure.

The fluid passage means may, by way of example, pass through the first end wall and the second end wall may be connected to the latch mechanism and the first end wall be connected to the retaining means.

In a particularly preferential embodiment, the latch means comprises an annular collet secured to said second end wall, a plurality of axially extending collet arms secured to said annular collet at circumferentially spaced locations, enlarged heads on the ends of said collet arms remote from said annular collet and an annular locking surface engagable by said enlarged heads.

Advantageously said retaining means comprises a shoulder on said one mandrel of said at least one pair engagable by the inner surface of said enlarged heads to retain the outer surface thereof in abutment with said annular locking surface, and an annular groove adjacent said shoulder whereby when said compensation chamber crushes said annular groove is positioned radially inwardly of said enlarged heads.

In order further to control the crushing of said compensation chamber, said portion of said at least one mandrel includes a cylindrical section located immediately radially inwardly and abutting the outer surface of said inner tube and wherein a cylindrical shroud is releasably connected to said portion having its inner cylindrical surface immediately adjacent and abutting the outer cylindrical surface of said outer tube whereby said inner and outer tubes are restrained to buckle inwardly.

While there is a possibility that there may be some hydrostatic pressure leaking from the water surrounding the joint of the invention, in order to stop this having any effect on the operation of the joint, it is prefered that fracture pins interconnect the shroud and the end wall effective to prevent these two components moving axially relative to one another. These fracture pins will simply snap when the frangible means, which may in the form of fracture bolts, themselves break and will have no material effect on the movement of the first and second mandrels relative to one another at such fracture.

In order to enable the joint of the present invention to be assembled, a locking ring is advantageously threadably engagable with the interior of said collet and abuts said first end wall effective to retain said enlarged heads in engagement with said annular locking surface. One of the further advantages of the present invention will arise from the fact the compensation chamber reduces the abutting force between the enlarged heads and the annular locking surface so that, upon fracture of the frangible means, and the said resulting movement, the enlarged heads can readily slide relative to the locking surface to enable the mandrels to disengage from one another.

A generally cylindrical extension may be provided completely to surround the compensation chamber and the latch means and a lock-out assembly can be associated with this to prevent any axial movement between the portion of one mandrel and the part of the other mandrel whereby the joint can be assembled at the surface and lowered to the sea-bed without there being any fear of it accidentally rupturing due to this operation.

One preferred construction of such lock-out mechanism comprises a holding ring threadably engaged with said portion of said mandrel of said at least one pair, a first annular shoulder formed on said extension adjacent the free end thereof, a second annular shoulder formed on said holding ring, a plurality of part annular shells mountable around said shoulders to hold said shoulders together, a sleeve surrounding said holding ring and said shells, to hold said shells in position and means to allow said sleeve to move axially relative to said holding ring thereby to release said shells and de-activate said lock-up mechanism.

The sleeve may be moved axially manually, for example, but it is preferably movable by applying hydraulic pressure to the interior of the shell. This hydraulic pressure can be provided through a flexible hydraulic line assembled at the surface so that the whole joint can be mounted without the need to use divers.

BRIEF DESCRIPTION OF THE DRAWINGS

In order that the invention may fully be understood the following detailed description of a presently preferred embodiment of pipeline safety joint is given below references being made to the drawings in which FIGS. 1A and 1B are two parts of a single half section through said one preferred embodiment of joint according to the invention.

DETAILED DESCRIPTION OF PREFERRED EMBODIMENT

Figure 1A:
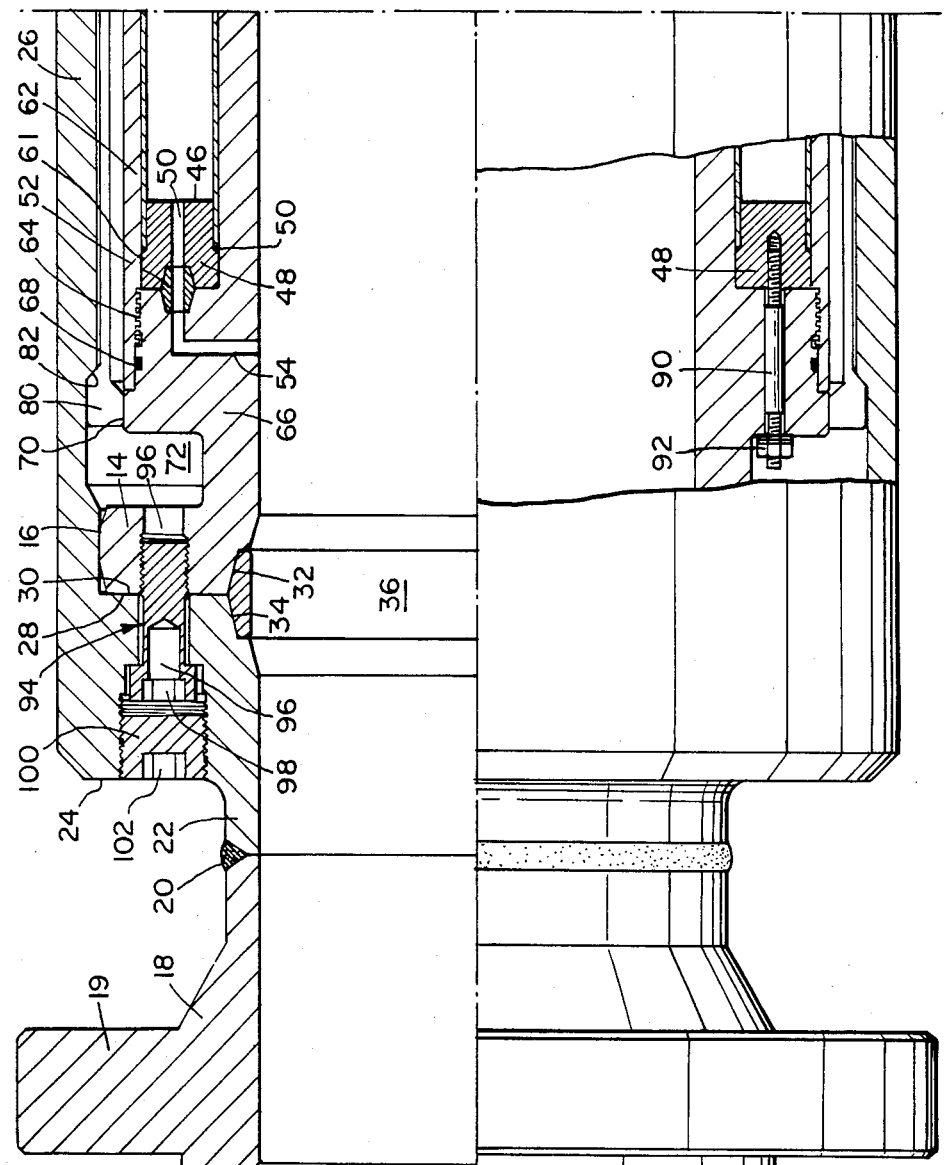

A pipe-end 10 is shown screwed to a first mandrel 12 provided at its left-hand end with a radial flange 14 having a part spherical outer surface 16. A second pipe-end 18 having a radial flange 19 is welded at 20 to a second mandrel 22 having a radial flange 24 which is provided with a cylindrical extension 26. The flanges 14 and 24 are each provided with flat abutting surfaces 28, 30, respectively, and with frusto conical seal retaining surfaces 32,34 into which may be fitted a metal seal ring 36.

The first mandrel 12 includes a cylindrical section 38 having an outer cylindrical surface located immediately radially inwardly and abutting the inner surface of an inner Inconel tube 40. A co-axial outer Inconel tube 42 defines, with said inner tube 40, a pressure compensation chamber 44 which is closed at the left-end, as in the drawing, by a first end wall 46 of a stainless steel plug 48 and a fluid passage 50 is formed in said plug 48 and communicates, via a bush 52 with a further fluid passage 54 connected to the interior of the first mandrel 12.

At its right end, as seen in the drawings, the chamber 44 is closed by the second end wall 56 in a stainless steel plug 58. The inner and outer tubes 40 and 42 are secured, in a fluid-light manner, to the plugs 48, 58 by end welds 60, 61 respectively.

A shroud 62 is secured by threading 64 to a thickened portion 66 of the mandrel 12 and the inner surface of the shroud 62, which is cylindrical, abuts the outer tube 42 along its length to support the outer surface thereof. The gasket 68 ensures a seal between the shroud 62 and the thickened portion 66 which is provided, adjacent the end of the shroud, with a retaining surface 70 which is an annular shoulder adjacent an annular groove 72 formed between the shoulder 70 and the flange 14. Radial shear pins 74 which are circumferentially spaced around the annular plug 58 are engaged in suitable apertures formed in the shroud 62 for a reason to be explained later.

Surrounding the shroud 62 are circumferentially spaced arms 76 of an annular collet 78, the arms 76 being provided with enlarged heads 80, the inner surfaces of which engage the retaining shoulder 70 and the outer surfaces of which engage an annular inclined locking surface 82 formed on the extension 26. The collet 78 is threaded to the outer surface of a locking ring 84 the left-hand end of which is brought up to abut the annular second plug 58. It will be noted that a rebate 84 on the collet 78 and extension 26 engage one another immediately radially outwardly of the thread 85 on the nut 84.

The collet 78, with its arms 76 and enlarged heads 80 co-operate with the locking surface 82 to form a latch means.

It will be seen in the lower half of FIG. 1a that the first annular end plug 48 is retained by studs 90 provided with nuts 92 engaging the radial face of the shoulder 70.

The sealing ring 36 is retained in place by frangible fracture bolts 94 threaded into apertures 96 in the flange 14 and passing through co-operating apertures in the flange 24. The fracture bolts 94 are threaded at their right end as seen in the drawing, and are provided with a calibrating bore 96 and a hexagan socket 98 to enable them to be tightened. A sealing plug 100 is also threaded into each aperture formed in the flange 24 and is itself provided with a tightening socket 102.

At the right-hand end, as seen in the drawing, a lock-out assembly 104 is associated with the pipeline safety joint of the invention. This includes a holding ring 106 threadably engaged at 108 to the first mandrel 12 and provided with an overhanging inner skirt 110 which overlies and abuts an end portion 112 of the extension 26. A metal to metal seal ring 114 with a back-up resilient ring (not referenced) is provided to form a seal between the skirt portion 110 and the part 112 of the extension 26.

Part annular segments 116 have parts engaging a first shoulder 118 on the extension 26 and a second shoulder 120 on the holding ring 106.

A sleeve 122 includes an annular extension 124 engaging the outer surfaces of the part annular segments 116 to hold them in place and also includes an inner sleeve portion 126 engaged in a co-operating recess in the holding ring 106. Optional bolts 128 are provided in the holding ring 106 which is also provided with an inlet 130 to an annular recess 132 formed between the sleeve 122 and the holding ring 106. A hydraulic line may be connected to the inlet 130 so that when hydraulic fluid is applied under pressure, the sleeve 122 will be moved to the right thereby to release the segments 116.

OPERATION

The above described and disclosed construction is assembled at the surface, as shown, by welding the pipe-end 18 to the second mandrel 22.

The preformed pressure compensation chamber 24 is slid onto the cylindrical sleeve part 38 of the first mandrel 12 and is secured by tightening the nut 92 on the studs 90. The collet 78 is moved to a somewhat more leftward position than shown so that the enlarged heads 80 of the arms 76 are engaged in the annular groove 72.

The sleeve 62 is screwed onto the enlarged portion 66 of the mandrel 12 and the fracture pins 74 itself.

The sealing ring 36 and the mandrel 12 and its associated parts are inserted into the extension part 26, so that the sealing ring 36 is engaged against the surface 32, 34 and the fracture bolts 94 tightened up to the desired pre-load whereafter the plugs 100 are screwed in. The nut 84 is then tightened up onto the collet 78 so that the enlarged heads are pulled back to engage the annular locking surface 82. At this stage the rebates 86 will engage one another.

The holding ring 106 is then screwed on to the mandrel 12, and the segments 116 positioned whereafter the sleeve 122 is inserted in place, after providing the various sealing rings 134, 136, 138. The thus formed lock-out assembly 104, therefore, prevents any of the parts moving relative to one another.

The flange 10 of the first pipe-end can then be screwed onto the first mandrel 12 and the whole assembly can thereafter be lowered to the bottom of the sea, the lock-out assembly 104 preventing any relative movement of the parts. When at the bottom of the sea and in the correct position, the pressure can be fed via a hose (not shown) screwed into inlet 130 to fill the chamber 132 and thereby move the sleeve 122 to the right so that the segments 116 can fall off thereby to activate the safety joint of the invention.

When oil or other fluid is pumped or passed through the pipeline, the tendency would normally be to blow the two surfaces 28, 30 apart to uncouple the whole assembly. However, fluid pressure is fed via fluid passages 54, 52, 50 to the compensation chamber the size of which is chosen, relative to the size of the sealing 36, fully to balance the forces. Part of the force is taken via the second plug 58, the locking nut 84 and collet 78 to the enlarged heads 80 engaging the surface 82. This, in essence, prevents the compensation chamber from moving to the right relative to the flange 24. The pressure on the surface 46, on the other hand, forces the plug 48 and, together with it, the first mandrel 12 to the left to equalise the forces. Because the chamber 44 is fully fluid tight, being sealed around its full periphery, there will be substantially no influence from external forces and no possibility of any leakage as has been the problem previously where sliding seals are involved in compensation chambers.

Should there be any hydrostatic pressure leaking in past the seal 114, then there will be a slight tendency to push the shroud 62 to the left but this is precluded by the shear pin 74 which can readily withstand the values of pressure which are likely to be encountered at the bottom of the sea, say, for example, 300 psi (22 bar).

The pipeline pressure is likely to be the order of 2000 psi (136 bar).

Should a ship's anchor, or the like, accidentally foul the pipeline at any place, then the said joint of the invention will tend to be stretched and this will cause the shear bolts 94 to fracture and initially this will allow the flange 14, together with the remaining parts of the first mandrel 12 to move to the right slightly. The rightward movement would normally be precluded by the abutment of the plug 58 against the nut 84, but the material of the inner and outer tubes 40, 42 is such as to allow these tubes to crumple sufficiently to enable the enlarged heads 80 to engage in the annular groove 72. Because of the chamfered surfaces of the heads 80 and the co-operating locking surface 82, the collet heads 80 will move radially inwardly and become disengaged from the locking surface, thereafter allowing the whole first mandrel assembly to move to the right.

The part spherical surface 16 on the flange 14 readily enables the flange 14 to disengage from within the leftward part of the extension part 26 second mandrel. It will be appreciated that the pressures involved will readily enable the shear pin 74 to break in order to allow the inner and outer tubes 40, 42 to crumple.

I claim;

1. A pipline safety joint to provide a controlled point of weakness in at least one pipeline, said safety joint comprising, in combination:
    (a) at at least one pair of tubular mandrels, each mandrel of a pair being sized to be securable to a pipe-end of a pipeline;
    (b) a portion of one mandrel of said at least one pair and a part of the other mandrel thereof, said portion being insertable in said part to provide fluid communication between said pipe-ends;
    (c) a latch mechanism on said portion of said at least one pair engageable with said part of the other mandrel thereof, effective to hold said mandrel against axial separation;
    (d) retaining means on said one mandrel of said at least one pair retaining said latch mechanism in engagement;

(e) a sealing ring positioned to seal said at least one pair of tubular mandrels;

(f) a fluid-tight pressure compensation chamber surrounding said portion of one mandrel of said at least one pair and engageable on said one mandrel and said other mandrel of said at least one pair;

(g) fluid passage means providing communication between the interior of said at least one mandrel and its associated fluid-tight pressure compensation chamber, said at least one seal and its associated compensation chamber being dimensioned whereby forces produced to separate said mandrels of a pair by fluid pressure within said mandrels are equalized by said fluid compensation chamber; and (h) frangible securing means normally holding said mandrels of said at least one pair in interengagement, but breaking when a predetermined stress is applied thereto, said pressure compensation chamber being constructed to be axially crushed when said frangible securing means break, thereby initially allowing limited axial movement between said mandrels of said at least one pair, sufficiently to permit said retaining means to move axially to release said latch mechanism, thereby to allow the mandrels of said at least one pair to disengage from one another.

2. A pipeline safety joint as claimed in claim 1, wherein said fluid compensation chamber comprises inner and outer co-axial rigid tubes surrounding said portion of said one mandrel of each said at least one pair and first and second end walls each interconnecting said inner and outer rigid tubes, to define therewith said fluid compensation chamber.

3. A pipeline safety joint as claimed in claim 2, wherein said fluid passage means passes through said first end wall.

4. A pipeline safety joint as claimed in claim 2, wherein said second end wall is connected to said latch means.

5. A pipeline safety joint as claimed in claim 2, wherein said first end wall is connected to said retaining means.

6. A pipeline safety joint as claimed in claim 4, wherein said latch means comprises an annular collet secured to said second end wall, a plurality of axially extending collet arms secured to said annular collet at circumferentially spaced locations, enlarged heads on the ends of said collet arms remote from said annular collet and an annular locking surface engagable by said enlarged heads.

7. A pipeline safety joint as claimed in claim 6, wherein said retaining means comprise a shoulder on said one mandrel of said at least one pair engagable by the inner surface of said enlarged heads to retain the outer surface thereof in abutment with said annular locking surface, and an annular groove adjacent said shoulder whereby when said compensation chamber is crushed said annular groove is positioned radially inwardly of said enlarged heads.

8. A pipeline safety joint as claimed in claim 6, wherein said portion of said at least one mandrel includes a cylindrical section located immediately radially inwardly and abutting the inner surface of said inner tube and wherein a cylindrical shroud is releasably connected to said portion having its inner cylindrical surface immediately adjacent and abutting the outer cylindrical surface of said outer tube whereby said inner and outer tubes are restrained to crush inwardly.

9. A pipeline safety joint as claimed in claim 8, and further comprising fracture pins interconnecting said shroud and said second end wall.

10. A pipeline safety joint as claimed in claim 8, and further comprisng a locking ring threadably engagable with the interior of said collet and abutting said first end wall effective to retain said enlarged heads in engagement with said annular locking surface.

11. A pipeline safety joint as claimed in claim 1, wherein said part of said other mandrel comprises a generally cylindrical extension completely surrounding said compensation chamber and said latch means.

12. A pipeline safety joint as claimed in claim 11, and further comprising a lock-out assembly preventing any axial movement between said portion of said one mandrel and said part of the other mandrel.

13. A pipeline safety joint as claimed in claim 12, wherein said lock-out mechanism comprises a holding ring threadably engaged with said portion of said mandrel of said at least one pair, a first annular shoulder formed on said extension adjacent the free end thereof, a second annular shoulder formed on said holding ring, a plurality of part annular shells mountable around said shoulders to hold said shoulders together, a sleeve surrounding said holding ring and said shells, to hold said shells in position and means to allow said sleeve to move axially relative to said holding ring thereby to release said shells and de-activate said lock-out mechanism.

14. A pipeline safety joint as claimed in claim 13, wherein said sleeve is moved axially by applying hydraulic pressure to the interior of said shell.

15. A pipeline safety joint as claimed in claim 11, and further comprising seal means between said holding ring and said extension effect to prevent hydrostatic pressure appearing within said extension.

* * * * *